United States Patent [19]

Sandstrom et al.

[11] Patent Number: 4,574,140

[45] Date of Patent: Mar. 4, 1986

[54] GREEN STRENGTH OF ELASTOMERS

[75] Inventors: Paul H. Sandstrom, Tallmadge; Emil M. Friedman, Cleveland Heights, both of Ohio

[73] Assignee: The Goodyear Tire & Rubber Company, Akron, Ohio

[21] Appl. No.: 508,297

[22] Filed: Jun. 27, 1983

[51] Int. Cl.$^4$ .................. C08L 9/00; C08F 236/02
[52] U.S. Cl. .................. 525/123; 525/374; 526/320; 526/348.6; 526/348.8; 526/916; 526/316
[58] Field of Search .............. 525/529, 530, 374, 123, 525/126; 526/320, 182, 348.6, 916, 316; 524/554, 560, 564

[56] References Cited

U.S. PATENT DOCUMENTS

| | | | |
|---|---|---|---|
| 3,288,883 | 11/1966 | Temin et al. | 526/320 |
| 3,642,739 | 2/1972 | Van Gogh et al. | 526/320 |
| 3,855,379 | 12/1974 | Araki et al. | 525/126 |
| 3,974,129 | 8/1976 | De La Mare | 526/320 |
| 4,025,578 | 5/1977 | Siebert | 525/529 |
| 4,210,702 | 7/1980 | Dalibor | 526/320 |
| 4,313,859 | 2/1982 | Gardner | 525/285 |
| 4,410,656 | 10/1983 | Coran et al. | 525/285 |
| 4,446,281 | 5/1984 | Takamatsu et al. | 525/285 |

Primary Examiner—Allan M. Lieberman
Attorney, Agent, or Firm—Alvin T. Rockhill; Bruce J. Hendricks

[57] ABSTRACT

The green strength of synthetic elastomers is improved by forming copolymers from at least one type of various synthetic elastomer forming monomers with a hydroxyl containing monomer having the formula:

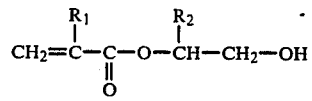

or

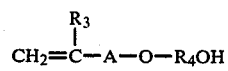

wherein $R_1$, $R_2$ and $R_3$ are either hydrogen or a methyl group and $R_4$ is an alkyl group having 1–10 carbon atoms and A is a methylene or carbonyl group. The green strength is further improved if a small amount of a hydroxyl ester cross-linking agent is utilized.

14 Claims, 2 Drawing Figures a. NR/NATSYN™/SBR b. NR/NATSYN™/BSH c. NR/NATSYN™/BSH + 0.4 phr ZINC CHLORIDE d. NR/NATSYN™/BSH + 0.6 phr MDI

NATSYN™ = GOODYEAR VERY HIGH CIS SYNTHETIC POLYISOPRENE

GREEN STRENGTH OF ELASTOMERS

BACKGROUND OF THE INVENTION

The present invention relates to improving the green strength of various synthetic elastomers. More specifically, the present invention relates to obtaining improved green strength of various elastomers by forming a copolymer therewith through the use of specific hydroxyl containing monomers. The green strength can be further improved by utilizing specific cross-linking agents to cross-link the copolymers. Additionally and preferably, the present invention relates to the addition of the above-noted hydroxyl containing copolymers to various synthetic elastomers or natural rubber to form blends which selectively are cross-linked with hydroxyl ester cross-linking agents wherein such blends have improved green strength.

Heretofore, although progress in the elastomer field has improved to such an extent that synthetic elastomers have supplemented or replaced natural rubber to a large extent in the fabrication of tires or other rubber products, synthetic elastomers still generally exhibit low green strength. This is true even for synthetic cis-1,4-polyisoprene. By the term "green strength" it is generally meant that property of a polymer or elastomer common in natural rubber, which contributes to the proper building conditions where multiple components are employed and which result in little or undesirable relative movement of the assembled components subsequent to assembly and prior to initiation of the curing operation. Generally, green strength is measured by stress-strain measurements.

Among the various compounds or agents which have been utilized to improve green strength of synthetic rubber elastomers is maleic acid as set forth in U.S. Pat. No. 3,893,983, maleic anhydride with a free radical initiator as set forth in U.S. Pat. No. 3,897,403 and maleinized polyisoprene rubber composition containing a compound of the metal of groups 2 and 4 of the Periodic Table as set forth in U.S. Pat. No. 3,898,193. However, these patents do not relate to the formation of copolymers with hydroxyl containing monomers and the like.

SUMMARY OF THE INVENTION

There is disclosed a process comprising forming a synthetic elastomer copolymer having improved green strength by reacting at least one type of synthetic elastomer forming monomer with an hydroxyl containing monomer, said synthetic elastomer forming monomer selected from the class consisting of at least one type of a conjugated diene monomer having from 4 to 10 carbon atoms, or at least one type of an olefin monomer having from 2 to 14 carbon atoms in combination with at least one type of a conjugated diene monomer having from 4 to 10 carbon atoms, said hydroxyl containing monomer selected from the class of compounds having the formula:

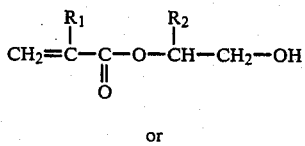

or

wherein $R_1$, $R_2$ and $R_3$ are either hydrogen or a methyl group and $R_4$ is an alkyl group having 1-10 carbon atoms and A is a methylene or carbonyl group, the amount of said hydroxyl compound in said copolymer ranging from about 0.5 percent to about 75 percent by weight based upon the total weight of said copolymer. Also disclosed is a process for partially cross-linking the synthetic elastomer by adding and reacting from 0.1 to 10.0 parts by weight based upon 100 parts of said copolymer of a hydroxyl ester cross-linking agent or complexing agent such as $ZnCl_2$; said hydroxyl ester cross-linking agent selected from the class consisting of diamines, polyamines, diepoxides and polyepoxides, anhydrides of diacids and anhydrides of polyacids, dicarboxylic acids, polycarboxylic acids, diisocyanates and polyisocyanates, and permutations of the above, wherein said diamines and said polyamines are selected from the class consisting of an aliphatic containing from 2 to 16 carbon atoms, a cycloaliphatic containing from 4 to 16 carbon atoms, an aromatic containing from 6 to 16 carbon atoms, and combinations thereof, wherein said anhydrides of diacids are selected from the class consisting of an aliphatic containing from 2 to 30 carbon atoms, a cycloaliphatic containing from 4 to 30 carbon atoms, an aromatic containing from 6 to 30 carbon atoms, and combinations thereof, wherein said dicarboxylic acids and said polycarboxylic acids are selected from the class consisting of an aliphatic containing from 2 to 30 carbon atoms, an aromatic containing from 6 to 30 carbon atoms, and combinations thereof, wherein said diisocyanates are selected from the class consisting of an aliphatic containing from 1 to 16 carbon atoms, a cycloaliphatic alkene containing from 4 to 16 carbon atoms, and combinations thereof, and said diepoxides and polyepoxides selected from the class consisting of epoxy resins containing terminal epoxy groups.

Also disclosed is a process for improving the green strength of an elastomer selected from the class consisting of synthetic elastomers and natural rubber by adding said hydroxyl containing copolymer to form a blend, the amount of said hydroxyl containing copolymer in said blend ranging from about 2 percent to about 98 percent by weight based upon the total weight of said blend, said synthetic elastomers selected from the class consisting of nitrile rubber, butyl rubber, chlorinated butyl rubber, brominated butyl rubber, polyalkenylenes, ethylene-propylene-diene rubber, polymers made from at least one type of a conjugated diene monomer having from 4 to 10 carbon atoms, and polymers made from at least one type of an olefin monomer having from 2 to 14 carbon atoms in combination with at least one type of a conjugated diene monomer having from 4 to 10 carbon atoms.

PREFERRED EMBODIMENTS OF THE INVENTION

Figure 1:
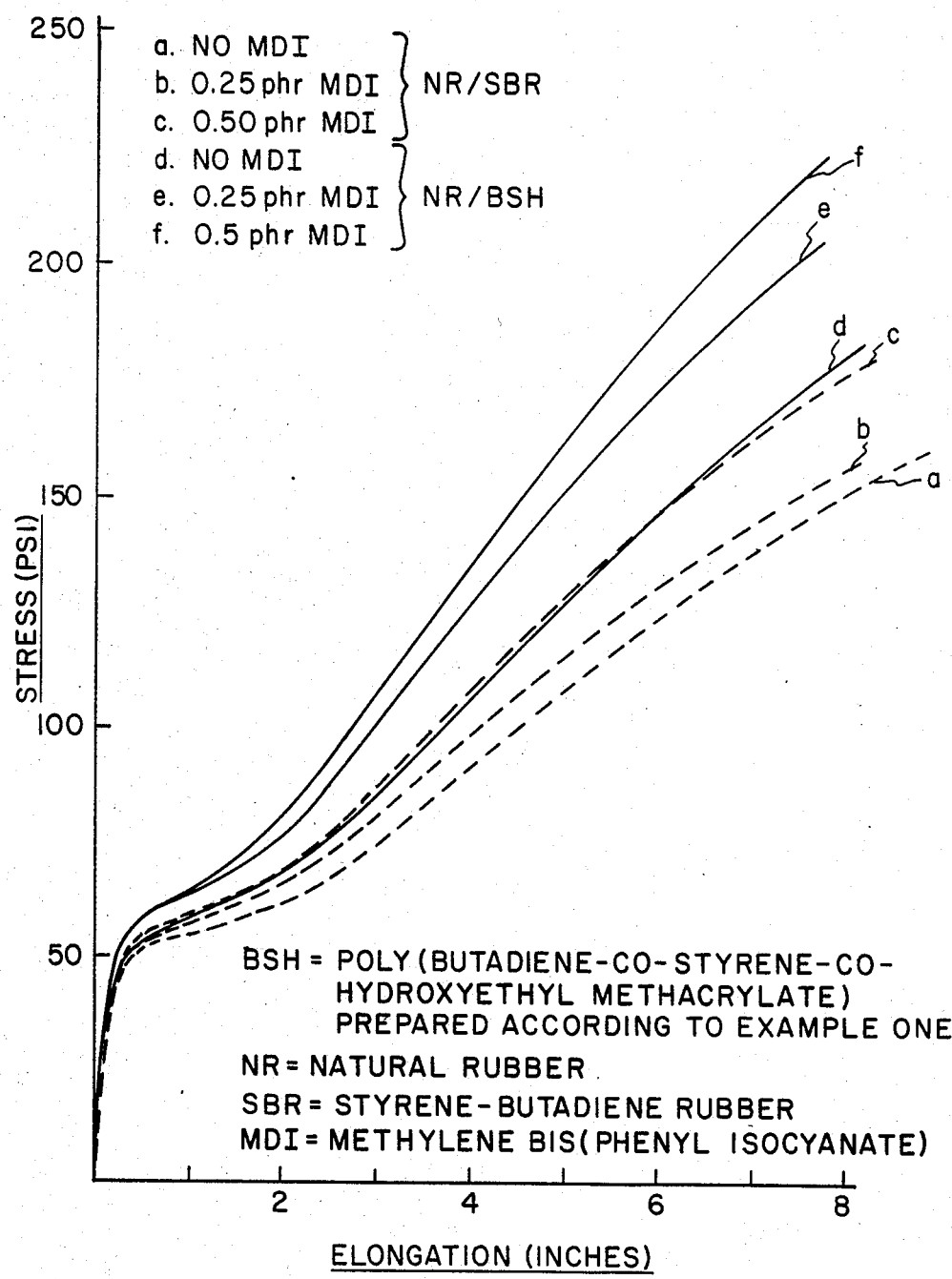
FIG. 1 is a graph showing the tensile strength (stress) in terms of pounds per square inch (psi) of blends of the copolymer of the present invention compared to a synthetic styrene-butadiene rubber control.

According to the concepts of the present invention, synthetic elastomers having improved green strength are made by producing copolymers from various types of synthetic elastomer forming monomers along with specific hydroxyl containing monomers. Generally, the copolymerization is carried out according to a free radical process and the polymerization may include any number of different types of synthetic elastomer forming monomers as well as any number of different types of hydroxyl containing monomers. The synthetic elastomer copolymer containing pendant hydroxyl groups may be blended with various synthetic elastomers as well as natural rubber (cis-1,4-polyisoprene). The green strength of the copolymers or their blends with various synthetic elastomers as well as natural rubber is further improved if they are partially or wholly cross-linked as through the use of hydroxyl cross-linking compounds such as amines, anhydrides, carboxylic acids, diisocyanates, complexing agents and epoxides.

The synthetic copolymers are made from monomers generally considered by the art as capable of forming rubber-type compounds. More specifically, the synthetic hydroxyl containing copolymers are made from monomers of at least one conjugated diene having from 4 to 10 carbon atoms so that diene homopolymers, copolymers, etc., may be utilized; monomers of at least one olefin having from 2 to 14 carbon atoms with at least one diene having from 4 to 10 carbon atoms so that copolymers of diene olefin mixtures may be utilized; and combinations thereof. Specific examples of diene monomers include butadiene, isoprene, piperylene, pentadiene, hexadiene, heptadiene, octadiene, 2,3-dimethylbutadiene and the like. Preferably, diene monomers having from 4 to 6 carbon atoms are preferred. Specific examples of olefin monomers include ethene, propene, butene, pentene, hexene, heptene, octene, nonene, decene, dodecene, the various isomers thereof and the like. Additionally, the olefins also include aromatic compounds such as the vinyl substituted aromatic hydrocarbons containing from 8 to 12 carbon atoms which are preferred. Specific examples of these compounds include styrene, alpha-methylstyrene, ortho-, para-, meta-methylstyrene, ethylstyrene and the like. Of the non-aromatic olefin compounds or monomers, those containing from 3 to 6 carbon atoms are preferred.

Specific examples of copolymers made of a diene and an olefin monomer include styrene-butadiene, alpha-methylstyrene and butadiene, butadiene and propene, butadiene and butene and the like. Of course, the polymers made from dienes and olefins may include several different types of monomers of both the diene and the olefin.

Preferred elastomer monomers of the present invention include isoprene, butadiene and styrene-butadiene.

When monomers of a diene and an olefin are utilized to prepare a synthetic elastomer with the hydroxyl monomers, the amount of the olefin by weight to the total weight of the copolymer, terpolymer, etc., of the diene and olefin generally ranges from about 1.0 percent to about 55 percent with a more desirable range being from about 10 percent to about 40 percent. A preferred range of the olefin compound such as styrene or alpha-methylstyrene ranges from about 15 percent to about 30 percent.

According to the present invention, hydroxyl containing monomers are utilized and reacted with the synthetic elastomer forming monomers during polymerization. The hydroxyl containing monomers have the following formula:

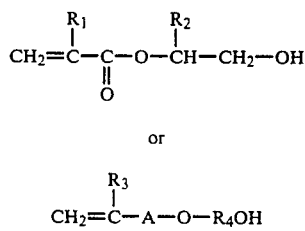

or $$CH_2=C-A-O-R_4OH$$
        |
        $R_3$ wherein $R_1$, $R_2$ and $R_3$ are either hydrogen or a methyl group and $R_4$ is an alkyl group having 1–10 carbon atoms and A is a methylene or carbonyl group. Some examples of preferred monomers thus include hydroxyl propyl methacrylate, hydroxyl ethyl methacrylate, hydroxyl ethyl acrylate and hydroxyl propyl acrylate.

The copolymers of the present invention are generally prepared via a free radical process utilizing conventional or common practices or procedures. That is, the method of preparation including various conditions such as temperature ranges, pressure ranges, reaction time period, free radical initiators, type of catalysts, as well as other polymerization aids or compounds which are well known to those skilled in the art. When making an SBR rubber, the emulsion polymerization is conventionally performed at a pH of from 10 to 11. It should be understood that the pH should not be limiting, in that the present invention can be used in solutions or emulsions having a pH outside this conventional range. The polymerization process preferably occurs according to an emulsion or solution process. A bulk process may be utilized but is generally undesirable.

Copolymers of the above set forth hydroxyl containing monomers and synthetic elastomer forming monomers have been found to give good green strength improvement wherein the copolymer contains from about 0.5 percent to about 75 percent by weight of the hydroxyl containing monomer. A preferred range extends from about 1 percent to about 25 percent by weight with a highly preferred range extending from about 2 percent to about 15 percent by weight. Usually, the amount of hydroxyl containing monomer in the copolymer will generally depend upon the type of green strength improvement required, the end use of the copolymer and the like. Obviously the hydroxyl containing monomer may be copolymerized with one or more elastomer forming monomers. Additionally, the copolymer may contain more than one type of hydroxyl containing monomer.

The improved green strength exhibited by the hydroxyl containing copolymers also imparts improved green strength to blends of the copolymers with various synthetic elastomers or natural rubber, particularly in the presence of a hydroxyl cross-linking agent or complexing agent as described previously. Thus, they are suited for use in tires and in industrial applications such as conveyor belts, hoses, shoe soles and the like.

Further improvement in the green strength of synthetic hydroxyl containing copolymers is obtained by cross-linking them with hydroxyl ester cross-linking agents or $ZnCl_2$ during conventional processing conditions. The amount of cross-linking agent based upon 100 parts by weight of the hydroxyl containing copolymer ranges from about 0.1 parts to about 10.0 parts with 0.25 parts to about 1.0 parts being preferred. Desired classes of cross-linking agents include $ZnCl_2$; diamines, polyamines, anhydrides of diacids, dicarboxylic acids, polycarboxylic acids, diisocyanates and polyisocyanates, diepoxides and polyepoxides. The diamine or polyamine cross-linking agents may be aliphatic and contain from about 1 to 16 carbon atoms, cycloaliphatic and contain from about 4 to 16 carbon atoms, aromatic and contain from 6 to 16 carbon atoms and combinations thereof. Specific examples include isophorone diamine, methylene bis(cyclohexylamine), diamino diphenyl methane, diamino diphenyldisulfide, diaminodipenylsulfone, phenyl diamine and pentamethylene diamine. Considering the anhydride cross-linking agents, they may be an aliphatic containing a total of from 2 to 30 carbon atoms, a cycloaliphatic containing from 4 to 30 carbon atoms, an aromatic containing from 6 to 30 carbon atoms, and combinations thereof. The dicarboxylic and polycarboxylic acid cross-linking agents may be an aliphatic containing from 2 to 30 carbon atoms, an aromatic containing from 6 to 30 carbon atoms and combinations thereof. Specific examples include succinic acid or anhydride thereof, oxalic acid or anhydride thereof, malonic acid or anhydride thereof and phthalic acid or anhydride thereof. The diisocyanate cross-linking agents may be aliphatic and contain from 1 to 16 carbon atoms, cycloaliphatic and contain 4 to 16 carbon atoms, aromatic and contain from 6 to 16 carbon atoms and combinations thereof. Specific examples include methylene bis(phenyl isocyanate), toluene diisocyanate and methylene bis(cyclohexyl isocyanate).

Examples of specific preferred hydroxyl cross-linking agents or compounds include methylene bis(phenyl isocyanate), toluene diisocyanate and methylene bis(cyclohexyl amine). Another preferred cross-linking agent is $ZnCl_2$.

According to the preferred embodiment of the present invention, the cross-linked hydroxyl containing copolymers are blended with various synthetic elastomers and/or natural rubber to form blends which have greatly improved green strength. These blends desirably are made by adding the various copolymers of the synthetic elastomer monomers and hydroxyl containing monomers to a mixing vessel such as a Banbury along with various synthetic elastomers and/or natural rubber followed by hydroxyl cross-linking agents. When mixed, this produces selective cross-linking of the hydroxyl containing copolymer but not the synthetic elastomer or natural rubber in the blend. The vessel may be slightly heated to speed the cross-linking reaction. Generally, the amount of cross-linking agents utilized may vary from about 0.5 to about 10 parts per 100 parts of the blend which includes hydroxyl containing interpolymers as well as the synthetic elastomers and/or natural rubber. A preferred range extends from about 0.25 to about 2.0 parts per 100 parts of the blend. Additionally, the hydroxyl containing copolymer may be in the form of a latex and can be mixed with a latex of an elastomer such as polybutadiene, a copolymer of styrene and butadiene, nitrile rubber, and the like. The blended latices may then be coagulated and dryed according to any conventional method and then cross-linked by the cross-linking agents of the present invention in a mixing vessel such as a Banbury.

Use of crosslinkers herein described function during processing of the rubber compounds and are not to be deemed as a substitute for conventional sulphur accelerators, which function during vulcanization of the finished article.

The elastomer or the already formed elastomers, which are added to the hydroxyl containing copolymer to form the blend, may be made from the same monomers utilized in making the copolymer. Thus, they may be made from dienes having from 4 to 10 carbon atoms, copolymers thereof and so forth and from diene-olefin copolymers, terpolymers and so forth wherein the olefin contains from 2 to 14 carbon atoms. Specific examples of the blend elastomers include both cis and trans polybutadiene, both cis and trans polyisoprene, polypiperylene, a copolymer of styrene and butadiene, a copolymer of alpha-methylstyrene and butadiene, a copolymer of butadiene and butene and the like. Desirably, high cis-1,4-polyisoprene and high cis-1,4-polybutadiene are preferred wherein the homopolymer contains more than 70 percent of the cis-1,4 structure. The copolymer of styrene and butadiene is also preferred.

Other blend elastomers include polydimethylbutadiene, butyl rubber, chlorinated and brominated butyl rubber, polychloroprene (neoprene), nitrile rubbers which are polymers of butadiene and acrylonitrile having ratios of the two monomers similar to the ratio of butadiene to styrene and styrenebutadiene rubber (SBR), EPDM and the polyalkenylenes. In the present invention, EPDM means an ethylene-propylene-diene-rubber containing from about 20 to about 75 weight percent of ethylene, from about 80 to about 25 percent weight of propylene and a minor portion of from about 1 to about 15 weight percent of nonconjugated dienes containing from 5 to 30 carbon atoms. Typical examples include a terpolymer of ethylene propylene and a suitable diene such as 1,4-hexadiene, dicyclopentadiene, ethylidene norbornene, or methylene norbornene. The polyalkenylenes are homopolymers of cyclomonoolefins, homopolymers of nonconjugated cyclopolyolefins, and copolymers of cyclomonoolefins with nonconjugated cyclopolyolefins. Examples include polypentenylene which is a homopolymer of cyclopentene having from about 5 to 99 percent cis and 95 to about 1 percent trans configuration of double bonds; polyoctenylene which is a homopolymer of cyclooctene having from about 25 to about 95 percent cis and about 75 percent to about 5 percent trans configuration of double bonds; polyoctadienylene which is a homopolymer of 1,5-cyclooctadiene having from about 25 to about 85 percent cis and from about 75 to about 15 percent trans configurations of double bonds; copolymers of cyclopentene and dicyclopentadiene containing from about 10 to about 30 mole percent dicyclopentadiene; and copolymers of cyclooctene and 1,5-cyclooctadiene containing from 10 to about 50 mole percent of cyclooctadiene.

Of course, as previously noted, natural rubber, that is cis-1-4-polyisoprene which occurs in nature, may also be utilized.

Preferred elastomers include natural rubber synthetic high cis-1,4-polyisoprene. EPDM, styrene-butadiene rubber (SBR) and high cis-1,4-polybutadiene. By the term "high cis", it is meant that 95 percent or more of the repeating units in the polymer is in the cis configuration.

The amount of the hydroxyl containing copolymer utilized in the immediately above-described blends generally can range from about 2 to about 98 percent by weight based upon the total weight of the blend with a preferred range being from about 5 percent to about 50 percent by weight.

As in the use of synthetic elastomers or natural rubber, the hydroxyl containing copolymers of the present invention and the blends thereof, whether or not cross-linked, can be compounded in any conventional manner, method, or process such as on a mill or in a Banbury at common or conventional temperatures with conventional compounding agents. That is, the copolymers and the blends thereof, whether or not cross-linked, are mixed with various conventional or typical compounds or additives well known to those skilled in the art to generally improve the strength, modulus, ease of processing, reduction of oxidation, and the like. Thus, typical amounts of various compounds such as carbon blacks, various clays, various silicas, various oils including aliphatic and aromatic oils, various anti-oxidants various accelerators such as zinc oxide, and various curing agents such as peroxide or sulfur curatives may be added and mixed. The amounts of the various compounds or additives, of course, are well known to those skilled in the art and will tend to vary as to the type and amount depending upon the desired end use of the copolymer or blend. Of course, the various curing agents are not initiated or vulcanized during the mixing process until the copolymers or blends thereof, whether or not cross-linked, are extruded, molded or shaped by any method into a desired form such as the carcass of a tire.

The invention will be better understood by the following examples.

EXAMPLE 1

A terpolymer latex of butadiene, styrene, and hydroxyl ethyl methacrylate (HEMA) was prepared in a conventional emulsion polymerization according to Recipe A shown in Table 1. After steam-stripping, it was oil-extended (37.5 parts), stabilized with 1.25 parts Wingstay C TM, and salt-acid coagulated. It had a Mooney viscosity (ML) of 29.

It and a comparable production styrene/butadiene rubber (SBR) were compounded according to the formula shown in Table 2. The productive stock was milled and 0.1 in dumbells were cut. The green strength results (FIG. 1) show that terpolymer leads to better green strength, methylene bis(4-phenyl isocyanate) (MDI) leads to better green strength, and when both are used, the improvements are at least additive and possibly synergistic.

EXAMPLE 2

A terpolymer analogous to that of Example 1 was prepared using Recipe B (Table 1). It had a Mooney of 61. It, and a comparable production SBR were compounded in a carcass formulation, and tested as in Example 1. In this case productive stock was molded for 3 minutes at 107° C. in order to better simulate green rubber under factory conditions.

Figure 2:
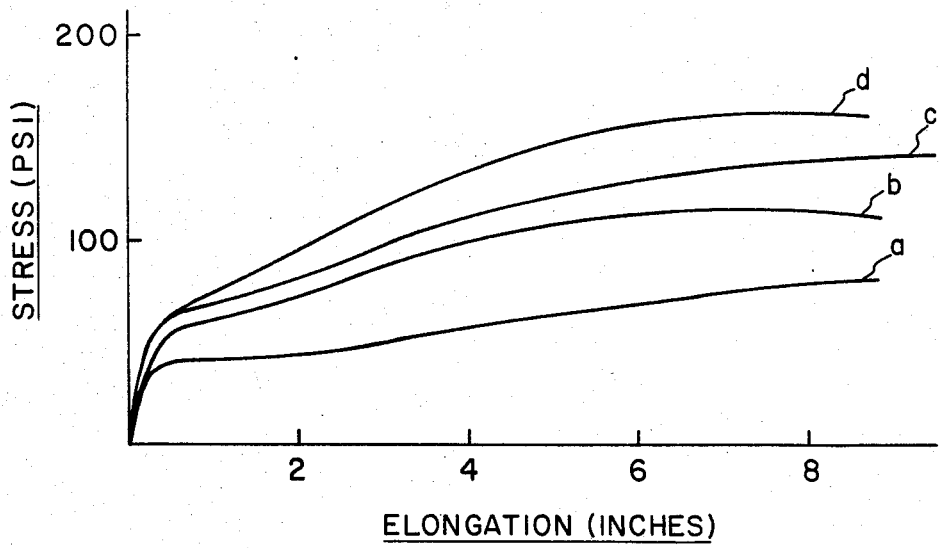
FIG. 2 is a graph showing the tensile strength versus elongation of a blend of the copolymers of the present invention compared to synthetic styrene-butadiene rubber.

The results (FIG. 2) are analogous to Example 1. The results also show that $ZnCl_2$ is an adequate cross-linker for the terpolymer.

EXAMPLE 3

The terpolymer (butadiene-styrene-HEMA) of Example 1 was compounded as in Example 1. A butadiene-styrene-glycidyl methacrylate (GMA) terpolymer was prepared using Recipe C (Table I), it was stripped, coagulated and compounded as in Example 1. The oil extended GMA terpolymer had a Mooney of 91. As seen from Table 3, the HEMA terpolymer gave compounds having better vibrotester resilience than compounds of the GMA terpolymer.

TABLE I

| Material | Parts | | |
|---|---|---|---|
| | Recipe A | Recipe B | Recipe C |
| Water | 200 | 183 | 200 |
| Fatty acid | 2.20 | 2.1 | 2.25 |
| Potassium rosin acid soap | 2.20 | 2.1 | 2.20 |
| Sodium hydroxide | .28 | .29 | .28 |
| Sodium salt of a condensed naphthalene sulfonic acid | .15 | .15 | .15 |
| Electrolyte | .44 | .42 | .44 |
| Sodium pyrophosphate | .064 | .054 | .064 |
| t-dodecyl mercaptan | .28 | .28 | .28 |
| Ferrous sulfate | .02 | .02 | .02 |
| Sodium formaldehyde sulfoxylate | .024 | .024 | .033 |
| Iron chelating agent | .078 | .079 | .046 |
| Paramenthane hydroperoxide | .11 | .13 | .11 |
| Styrene | 24 | 24 | 24 |
| Butadiene | 74 | 74 | 74 |
| Hydroxyethylmethacrylate (HEMA) | 2 | 2 | — |
| Glycidyl methacrylate (GMA) | — | — | 2 |

TABLE II

| Material | Parts |
|---|---|
| Natural Rubber | 70.0 |
| Oil-extended SBR or Terpolymer | 41.25 |
| GPF Carbon Black | 50 |
| Shellflex 212 TM (medium process oil) | 4.0 |
| Zinc Oxide | 3.5 |
| Stearic Acid | 2.0 |
| Wingstay 100 TM | 1.0 |
| Mixed in brabender for 5 min. at 140° C., 50 RPM. Added methylene bis (4-phenyl diisocyanate) (MDI) after first minute of mixing (if used). | |
| Curatives | |
| Rubber Makers Sulfur | 2.5 |
| NOBS No. 1 (90% N—oxydiethylene benzthiazole-2-sulfenamide + 10% benzothiazyl disulfide) | 0.8 |
| Curatives added on laboratory mill | |

TABLE III

| Termonomer | Cross-linker | % Change of Vibrotester Resilience as Compared to Control* |
|---|---|---|
| None | 0.5 phr MDI | 4.6% higher |
| HEMA | None | Equivalent |
| HEMA | 0.5 phr MDI | 4.1% higher |
| None | 1.0 phr DADPDS[1] | 2.3% higher |
| GMA | 1.0 phr DADPDS[1] | 5.0% lower |

*"Control" = no termonomer, no cross-linker
NOTE: No termonomer means a production SBR was used.
[1]4,4'-diaminodiphenyl disulfide

We claim:
1. A process for forming a synthetic elastomer copolymer having improved green strength comprising reacting at least one type of a synthetic elastomer forming monomer with a hydroxyl containing monomer,
said synthetic elastomer forming monomer selected from the class consisting of (1) at least one type of a conjugated diene monomer having from 4 to 10 carbon atoms, and (2) at least one type of an olefin monomer having from 2 to 14 carbon atoms in combination with at least one type of a conjugated diene monomer having from 4 to 10 carbon atoms, wherein the amount of said olefin monomer by weight to the total weight of the copolymer of the diene and olefin ranges from about 1.0 percent to about 55 percent, said hydroxyl containing monomer having the formula

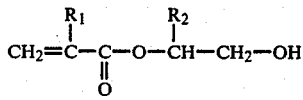

wherein $R_1$ and $R_2$ are either hydrogen or a methyl group and the amount of said hydroxyl monomer in said copolymer ranges from about 0.5 percent to about 75 percent by weight based upon the total weight of said hydroxyl containing monomer and synthetic elastomer forming monomer in said elastomer copolymer.

2. The process of claim 1 wherein said synthetic elastomer copolymer is partially crosslinked by adding and reacting from 0.1 to 10.0 parts by weight of a diisocyanate crosslinking agent, based upon 100 parts of said copolymer,
wherein said diisocyanate is selected from the class consisting of aliphatic diisocyanates containing 2 to 16 carbon atoms, cycloaliphatic diisocyanates containing from 6 to 16 carbon atoms, aromatic diisocyanates containing 6 to 16 carbon atoms and combinations thereof.

3. A process according to claim 1 wherein said synthetic elastomer monomers are selected from the class consisting of butadiene, isoprene, piperylene, mixtures of isoprene and butadiene, mixtures of butadiene and piperylene, mixtures of styrene and butadiene, and mixtures of alpha-methylstyrene and butadiene.

4. A process according to claim 1 wherein said hydroxyl containing monomer is selected from the class consisting of hydroxyethyl methacrylate, hydroxy propyl methacrylate, hydroxyethyl acrylate and hydroxy propyl acrylate.

5. A process according to claim 1 wherein the amount of said hydroxyl containing monomer in said copolymer ranges from 1.0 percent to 25 percent by weight.

6. A process according to claim 2 wherein said amount of cross-linking agent ranges from 0.25 to 1.0 part by weight.

7. A process according to claim 2, wherein said diisocyanate crosslinking agent is selected from the group consisting of methylene bis(phenyl isocyanate), toluene diisocyanate and methylene, bis(cyclohexyl isocyanate).

8. A synthetic elastomer prepared by a process comprising reacting at least one type of a synthetic elastomer forming monomer with an hydroxyl containing monomer,
said synthetic elastomer forming monomer selected from the class consisting of (1) at least one type of a conjugated diene monomer having from 4 to 10 carbon atoms, (2) and at least one type of an olefin monomer having from 2 to 14 carbon atoms in combination with at least one type of a conjugated diene monomer having from 4 to 10 carbon atoms, wherein the amount of said olefin monomer by weight to the total weight of the copolymer of the diene and olefin ranges from about 1.0 percent to about 55 percent,
said hydroxyl containing monomer having the formula:

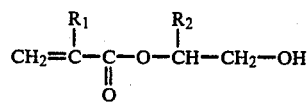

wherein $R_1$ and $R_2$ are either hydrogen or a methyl group and the amount of said hydroxyl monomer in said copolymer ranges from about 0.5 percent to about 75 percent by weight based upon the total weight of said hydroxyl containing monomer and synthetic elastomer forming monomer in said elastomer copolymer.

9. The synthetic elastomer of claim 8 wherein said synthetic elastomer is partially crosslinked by adding and reacting from 0.1 to 10.0 parts by weight of a diisocyanate crosslinking agent, based upon 100 parts of said copolymer, wherein said diisocyanate is selected from the class consisting of aliphatic diisocyanates containing 2 to 16 carbon atoms, cycloaliphatic diisocyanates containing from 6 to 16 carbon atoms, aromatic diisocyanates containing 6 to 16 carbon atoms and combinations thereof.

10. The synthetic elastomer of claim 9 wherein said synthetic elastomer forming monomer is selected from the group consisting of butadiene, mixtures of butadiene and piperylene, mixtures of styrene and butadiene, and mixtures of alpha-methylstyrene and butadiene.

11. The synthetic elastomer of claim 10 wherein said hydroxyl containing monomer is selected from the group consisting of hydroxyethyl methacrylate, hydroxy propyl methacrylate, hydroxyethyl acrylate and hydroxy propyl acrylate.

12. The synthetic elastomer of claim 11 wherein the amount of said hydroxyl containing monomer in said copolymer ranges from 1.0 percent to 25 percent by weight.

13. The synthetic elastomer of claim 12 wherein the amount of said cross-linking agent ranges from 0.25 to 1.0 parts by weight.

14. The synthetic elastomer of claim 13 wherein said hydroxyl containing compound is hydroxyethyl methacrylate.

* * * * *